GEORGE W. CLAMPITT.

Improvement in Chains for Watches, &c.

No. 120,623.                    Patented Nov. 7, 1871.

Witnesses:
A Bennewendorf.
Francis McArdle

Inventor:
Geo. W. Clampitt
PER Munn & Co.
Attorneys.

UNITED STATES PATENT OFFICE.

GEORGE W. CLAMPITT, OF ATTLEBOROUGH, ASSIGNOR TO HENRY F. BARROWS, OF NORTH ATTLEBOROUGH, MASSACHUSETTS.

IMPROVEMENT IN CHAINS FOR WATCHES, &c.

Specification forming part of Letters Patent No. 120,623, dated November 7, 1871.

*To all whom it may concern:*

Be it known that I, GEORGE W. CLAMPITT, of Attleborough, in the county of Bristol and State of Massachusetts, have invented certain Improvements in Construction of Chains; and I do hereby declare that the following is a full, clear, and exact description thereof, which will enable others skilled in the art to make and use the same, reference being had to the accompanying drawing forming part of this specification.

My invention consists in fastening the ends of the staples used for connecting the links of wide gold or other chains by lapping the said ends by each other, and bending or hooking them over the outer row of rings in such manner as to accomplish the fastening by bending only, which saves considerable labor heretofore expended in soldering the ends of the staples together, the said ends being bolted against each other. It also saves the solder and much labor heretofore used in removing the discoloring of the edge of the chain exposed to the heat in soldering; and there are no soldered portions exposed to view or parts discolored by solder. The final part of the bending is done by a punch struck by a hammer, which delivers a blow upon the chain edgewise in such manner as to shorten the staples and secure the links more closely together than they can be when soldered, thus making a more compact chain.

Figure 1:
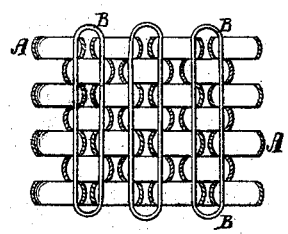
Figure 2:
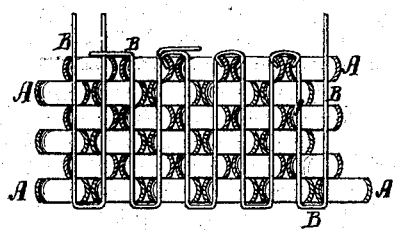

Figure 1 is a longitudinal sectional elevation of a piece of flat chain, such as used for bracelets, fob-chains, and the like, composed of many rows of links placed side by side, and staples running through them in the wide direction of the chain to lock them together, the said staples having the ends butted together at one edge of the chain, and soldered in the manner heretofore common in making these chains. Fig. 2 is a similar section of a chain, showing my improved mode of fastening the links, and Fig. 3 is an edge view.

Similar letters of reference indicate corresponding parts.

Figure 3:
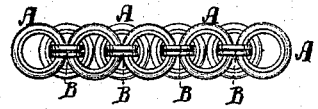

A represents the links, and B the staples, which are the same as have been heretofore used, except that I make the staples a little longer for lapping the two parts a short distance along the ends, over the ends of the row of links at one edge of the chain, and bending them down into the links again, as clearly shown in Figs. 2 and 3, for securing the said links together by hooks formed on the ends of the staples. This I accomplish by first bending the projecting ends of the staples down upon the ends of the links, so that they project across the opening of the links, and then force said ends into the links by a punch driven in, the chain being held in a clamp. This shortens the links a little, and condenses, hardens, and strengthens the part acted upon, securing the links more closely together, and making a permanent fastening in much less time and with much less cost than can be done when the links are soldered together, and the staples are not discolored by solder as heretofore.

Having thus described my invention, I claim as new and desire to secure by Letters Patent—

The fastening of the staples B by which the links A are secured together, by bending the ends of said staples over the ends of the links, substantially in the manner described.

The above specification of my invention signed by me this 9th day of September, 1871.

GEORGE W. CLAMPITT.

Witnesses:
SIMEON BOWEN,
WILLIAM H. BRIGGS.

(86)